United States Patent [19]

Seymour

[11] Patent Number: 4,577,805

[45] Date of Patent: Mar. 25, 1986

[54] AGRICULTURAL MIXING AND GRINDING MACHINE

[75] Inventor: Shaun A. Seymour, New Holland, Pa.

[73] Assignee: Sperry Corporation, New Holland, Pa.

[21] Appl. No.: 615,616

[22] Filed: May 31, 1984

[51] Int. Cl.$^4$ .............................................. B02C 19/00
[52] U.S. Cl. .............................. 241/101 B; 241/101.7; 241/186 A; 366/603
[58] Field of Search ................. 366/603, 80, 152, 153, 366/601, 43, 156, 158, 160; 241/101.7, 101 B, 186 A, 101 D

[56] References Cited

U.S. PATENT DOCUMENTS

| | | |
|---|---|---|
| 2,800,238 | 7/1967 | Oliver . |
| 2,877,914 | 3/1959 | Herr . |
| 2,894,733 | 7/1959 | Wosmek . |
| 3,085,789 | 4/1963 | Heider . |
| 3,168,291 | 2/1965 | Knoedler et al. ............... 366/160 X |
| 3,200,867 | 8/1965 | Stephan ........................ 366/160 X |
| 3,356,270 | 12/1967 | Heider . |
| 3,369,762 | 2/1968 | Buzenberg et al. . |
| 3,370,796 | 2/1968 | Herr ............................... 366/603 X |
| 3,429,418 | 2/1969 | Fyrk ............................... 366/601 X |
| 3,727,847 | 4/1973 | Nelson ............................ 241/101 B |
| 3,997,146 | 12/1976 | Kline . |
| 4,071,226 | 1/1978 | Miller . |
| 4,201,348 | 5/1980 | Bighee et al. ................... 241/101 B |
| 4,298,288 | 11/1981 | Weisbrod ........................ 366/20 X |
| 4,432,499 | 2/1984 | Henkensiefken et al. ...... 241/101 B |

Primary Examiner—Mark Rosenbaum
Attorney, Agent, or Firm—Darrell F. Marquette; Frank A. Seemar; Larry W. Miller

[57] ABSTRACT

An agricultural mixing and grinding machine including a plurality of bins respectively adapted to contain different feed material to be ground and/or mixed, a grinding unit mounted adjacent one end of the plurality of bins, and a receiving hopper adjacent the opposite end of the plurality of bins. Each bin having metering auger therein arranged to discharge material from the bins at a common location into a confluence and mixing auger extending longitudinally beneath the bins from the receiving hopper toward the grinding unit and communicating at one end with an elevating auger which transfers the material to an upper distributing auger that extends in one direction along the upper portions of the bins and also in an opposite direction to communicate with the grinding unit. The upper distributing auger having a reversible drive to selectively deliver mixed material to the grinding unit or deliver unmixed material to the bins when the metering augers are idle thereby rendering the confluence and mixing auger as a delivery auger for feeding different materials to the bins.

10 Claims, 4 Drawing Figures

AGRICULTURAL MIXING AND GRINDING MACHINE

BACKGROUND OF THE INVENTION

In modern agricultural practice, particularly in regard to preparing mixtures of feed and especially feed for animals to be slaughtered for human consumption, it is relatively common at present to provide feed material grinders and mixers which contain various feed materials and convey quantities thereof, preferably measured, to grinding and/or mixing equipment which produces a mixed feed of desired proportions of ingredients which is ready for delivery either to storage or to feed lots or troughs, as desired. Various arrangements of conveyors and especially augers are employed in prior devices of the type referred to and it is also relatively common practice to include mechanism of this type in portable machines and particularly those which derive power from a PTO arrangement which, for example, quite commonly derives power from a tractor. The present invention comprises an improvement over this type of mechanism and provides advantages over those devices which have been developed heretofore.

Representative of certain types of agricultural material grinder-mixer machines which have been developed heretofore are prior U.S. Pat. Nos. 2,800,238 to Oliver, dated July 23, 1957, and 3,997,146, to Kline, dated Dec. 14, 1976. In these devices, there is a central cylindrical tank having a truncated conical bottom and in which a vertical auger is arranged to feed material upwardly from an inlet auger communicating with the bottom of the tank and arranged to move feed either from a hammermill or a mixing hopper, the material then being further mixed in the tank prior to delivering the same to discharge mechanism such as a laterally extending auger from which the material is discharged to a feed lot, trough, or otherwise.

It has also been previously proposed to provide in a portable structure a plurality of bins or hopper in which, for example, different materials of feed are contained and augers are provided in the bottoms of the bins to feed the material for discharge in any desired manner. Such a machine comprises the subject matter of prior U.S. Pat. No. 3,356,270 to Heider, dated Dec. 5, 1967 and said patent illustrates certain types of closures over the augers in the bottoms of the bins and mechanism to open the closures to various degrees, as desired.

A more sophisticated type of portable feed grinder-mixer than disclosed in the preceding patents comprises the subject matter of prior U.S. Pat. No. 4,432,499 to Henkensiefken et al, dated Feb. 21, 1984, in which a single, relatively large hopper or bin is mounted on a portable frame and a pair of vertical augers extend upward from the lower portion of the bin to achieve mixing of material therein and, in the lower portion of the bin, a pair of horizontal augers are arranged for rotation in opposite directions in order to effect substantial mixing of material in the bin prior to the same being discharged, for example, by means of a vertical auger which communicates with an upper horizontal auger adapted to be swung to any location desired above the top of the bin.

Due to certain requirements of constantly progressive systems of feeding stock animals and especially those intended for human consumption, more sophisticated requirements are required by consumers of the machines presently being manufactured and accordingly, the necessitated changes require additions and innovations not found in the prior art and the present invention is an example of satisfying the further demand of the agricultural feeding industry, details of which are set forth below.

SUMMARY OF THE INVENTION

It is among the principal objectives of the present invention to provide a combination mixing and grinding machine to handle different kinds of agricultural feed material and to mix and/or grind the same in accurately determined quantities which are delivered from a plurality of bins each containing one of said materials, each bin being provided with a metering auger for delivery of measured quantities of each different kind of material to a confluence mixing auger arranged beneath the bins for delivery of the mixed material to a grinding unit.

It is another object of the invention to arrange the aforementioned metering augers for delivery to a substantially common location relative to the confluence mixing auger so that the material is well mixed prior to delivery to the grinding unit and in which it is even further mixed while being ground.

A further object of the invention is to operate the aforementioned metering augers by means of D.C. electric motors which derive power from an A.C. generator driven by a PTO unit comprising part of the machine. An electrical unit on the machine contains suitable converters for the output of the A.C. generator in order to deliver D.C. current to the motors. Appropriate adjustable voltage control mechanisms are included in the circuit to the D.C. motors to effect variation in the speed of the metering augers.

Still another object of the invention is to provide in association with the plurality of bins, referred to above, a receiving hopper at one end of the machine into which one end of the confluence mixing auger extends. The confluence mixing auger passes beneath the bins for communication with the lower end of an elevating auger which extends upward to an upper distributing auger which has one portion extending across the upper portions of the bins and another portion extending oppositely for communication and delivery to the grinding unit. When the metering augers are idle, the confluence mixing auger is capable of delivering unmixed material beneath the bins to the elevating auger which delivers the unmixed material to the upper distributing auger for distribution of the unmixed material to the bins. Suitable openings and closures are arranged in conjunction with the upper distributing auger to provide for discharge into one or another of the bins. The upper distributing auger also being reversible in direction to deliver mixed material from the confluence mixing auger to the grinding unit.

One further object of the invention also is to provide a grinding unit in the form of a hammermill and a converging auger mounted for receiving mixed and ground material substantially centrally from the hammermill for delivery to a laterally extending discharge auger.

One other object of the invention is to provide an arrangement of bins in a compact manner by arranging, for example a forward and rearward bin of similar cross-section but different lengths with each bin having a V-shaped bottom communicating with metering augers for said bins and, adjacent the rearward bin a plurality of additional smaller bins beneath the V-shaped bottom of the rearward bin. The smaller bins also have a sloping bottom wall leading to metering augers arranged with their discharge ends located adjacent the discharge ends of the metering augers for the forward and rearward bins.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT OF THE INVENTION

Figure 1:
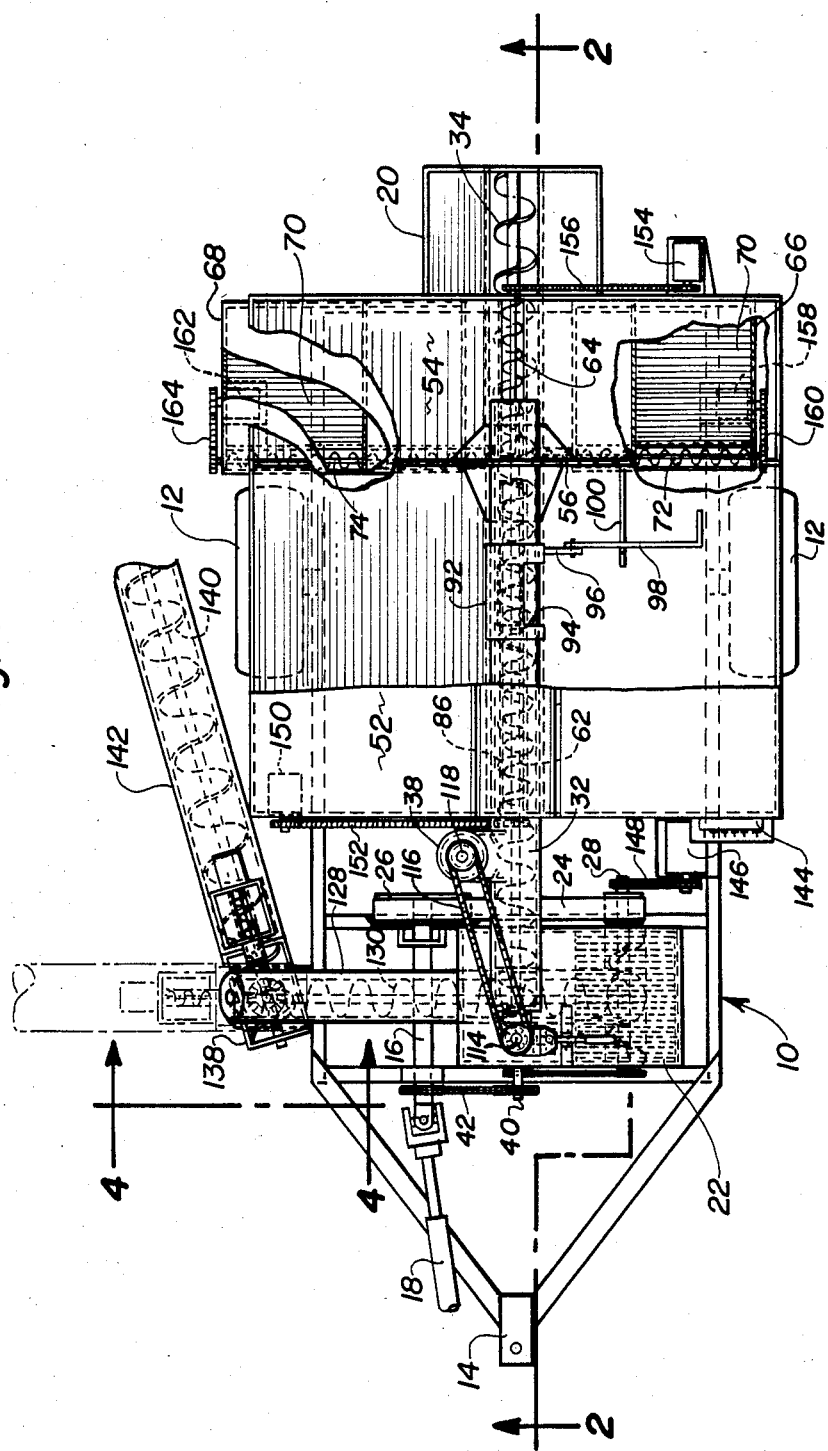
FIG. 1 is a top plan view of an agricultural mixing and grinding machine embodying the principles of the present invention.
Figure 2:
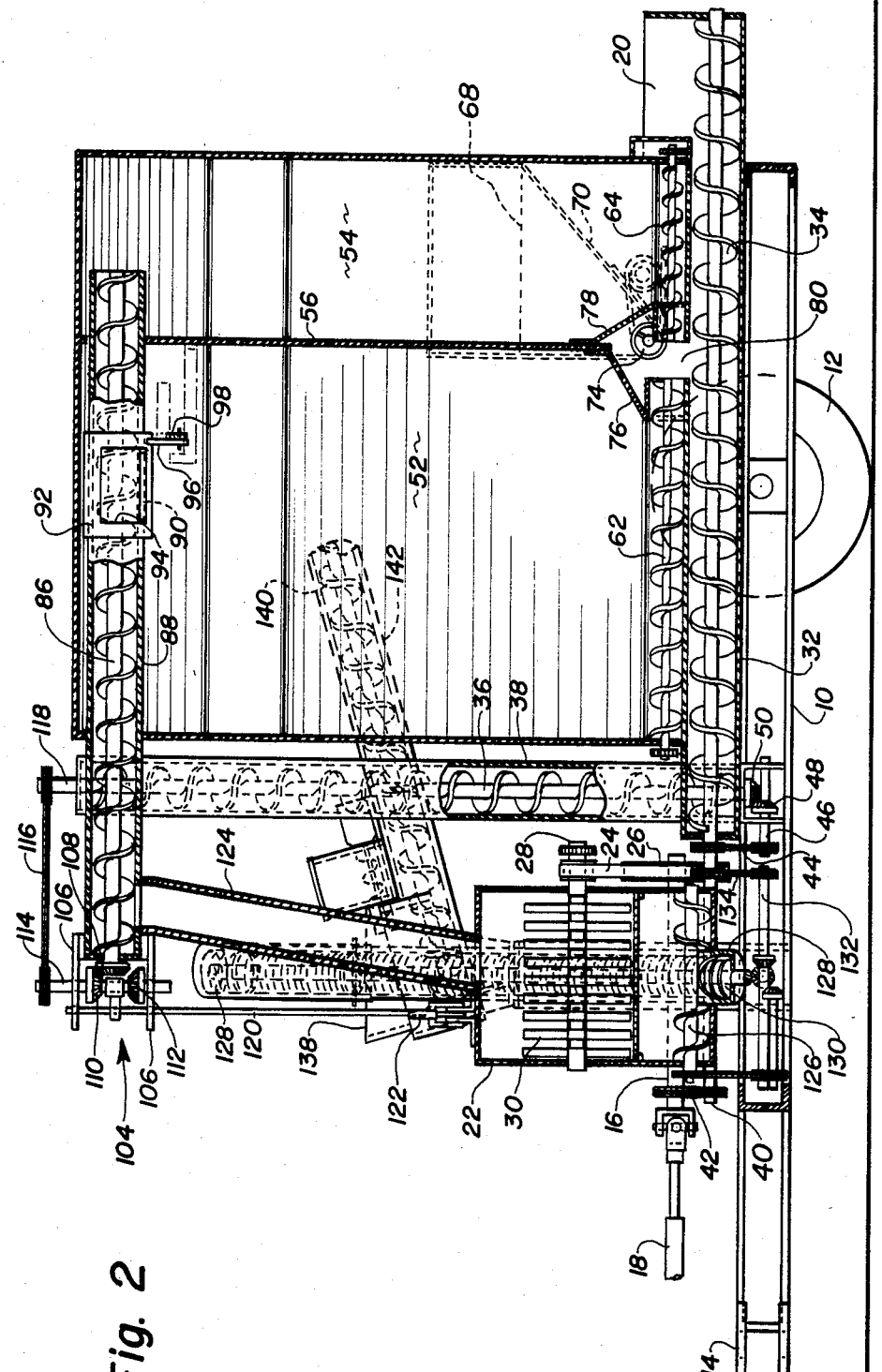
FIG. 2 is a vertical sectional view of the machine shown in FIG. 1 as seen on the line 2—2 thereof.

Referring particularly to FIGS. 1 and 2, the agricultural machine comprising the present invention basically includes a frame 10 which, in the preferred embodiment, is portable by including a pair of wheels 12 and the forward end is provided with a clevis 14 arranged to be connected to a source of power such as an agricultural tractor, not shown. The forward portion of the frame 10 also includes a driven shaft 16 arranged to be driven by a PTO shaft 18 connectable to such tractor. At the rearward end of the frame 10 is material receiving means in the form of a hopper 20 and the forward end of the frame 10 supports material grinding means specifically illustrated as a hammermill 22 which is driven by a belt 24 which interconnects a sheave 26 on shaft 16 and shaft 28 of the beater 30 of hammermill 22.

Extending rearwardly from hammermill 22 and substantially centrally of the frame 10 is a tubular housing 32 within which a combination confluence and mixing auger 34 is rotatable, said auger extending at one end into the hopper 20 and then forwardly to the lower end of an elevating auger 36 which is rotatable within a closely confining tube 38 which is connected to the inner end of the housing 32 for intercommunication between the respective augers rotatable therein. Driven shaft 16 directly drives shaft 40 of auger 34 as best seen in the forward portion of FIGS. 1 and 2, said shafts being interconnected by sprocket chain 42 which extends around sprocket gears respectively on said shafts. Shaft 40, by means of another sprocket chain 44 drives a jack shaft 46 by means of sprocket gears respectively on said shafts and mounted on jack shaft 46 is a bevel gear 48 which meshes with another bevel gear 50 fixed to the lower end of the central shaft of elevating auger 36, whereby it will be seen that the mechanism thus far described is driven by the PTO shaft 18.

Figure 3:
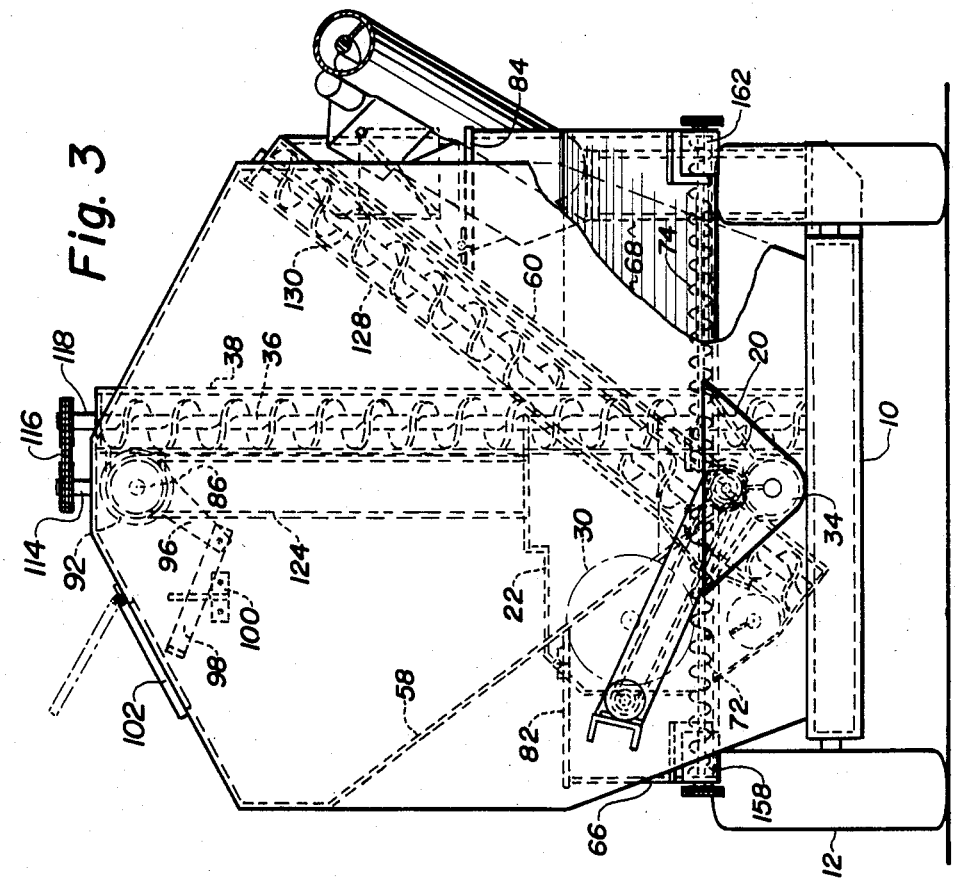
FIG. 3 is a vertical end view of the righthand end of the machine as viewed in FIG. 1.

A plurality of bins are arranged in compact nature upon frame 10 as best shown in FIGS. 1 and 2 but also in FIG. 3. Said bins comprise a first or forward bin 52 and a second or rearward bin 54, said bins being separated by a common vertical wall 56 best shown in FIG. 2. The opposite sides and especially the major lower portion of both of these bins is defined by sloping walls 58 and 60 which extend inward from opposite sidewalls and slope toward the bottom in which metering augers 62,64 are mounted, the walls 58 and 60 thus forming a V-shaped configuration which insures the material in the bins descending to the metering augers respectively therein. The metering auger 64 in bin 54 is separate from the metering auger 62 in bin 52.

Fitted sidewise into the spaces below the sloping sidewalls 58 and 60 of rearward bin 54 are additional bins 66 and 68 which each have a forwardly and downwardly sloping wall 70, see FIG. 2, which insures gravitational feed of the materials therein to the metering augers 72 and 74 respectively provided therein. As seen in FIG. 2, there are additional angular bottom walls 76 and 78 in bins 52,54 which slope away from each other respectively toward the metering augers 62 and 64 as shown in FIG. 2. From FIG. 2, it will also be seen that all of the metering augers of the respective bins have an exit end adjacent a space 80 directly above the confluence and mixing auger 34 so that the latter receives material from the respective metering augers simultaneously for active mixing thereof within the tubular housing 32 in which the auger 34 rotates.

In general, in accordance with the sizes of the various bins, the component of highest percentage naturally will be filled in the largest bin 52, the second largest in bin 54, and two additional smaller percentages of ingredients will be accommodated in bins 66 and 68. Due to the smaller capacity and corresponding smaller percentages of such latter ingredients, they readily may be introduced into the bins 66,68 manually and for that purpose, said bins respectively have hinged top covers 82 and 84 as best shown in FIG. 3. Access to the covers is obtained within the spaces exterior of the sloping sidewalls 58 and 60 of the first and second bins 52 and 54.

For purposes of feeding individual kinds of different material respectively to the bins 52 and 54, for example, the upper portions thereof support a horizontal upper distributing auger 86 which is operable within a tubular housing 88 which extends preferably entirely along the bin 52 and has one end extending into bin 54, the housing 88 being open at the end thereof in bin 54. Further, housing 88 also has an opening 90 disposed over bin 52 and a closure member 92 which preferably is tubular or partly tubular and is provided with a discharge opening 94 therein which, when the closure member 92 is rotated about the axis of auger 86, the opening 94 may be brought in to register with the opening 90 in the tubular housing 88. This preferably is accomplished manually by means of a radial arm 96 extending from the closure member 92 and connected at its outer end to a manually operable link 98, see FIG. 3, which is adjustably positionable with respect to a fixture 100 which may be connected at one end to wall 56. The outer end of link 98 is engageable through a trap door 102, see FIG. 3 or through an opening in the top wall of bin 52.

The foregoing description with regard to upper distributing auger 86 pertains to the function of said auger for purposes of filling or partially filling the bins 52 and 54 by means of the feeding functions of confluence and mixing auger 34 and elevating auger 36 which operate in conjunction with each other when the metering augers for the various bins are idle. Under such circumstances, the auger 86 operates in a feeding direction of rotation through the means of a gear shift unit 104 supported by brackets 106 fixed to the lefthand end of tubular housing 88 as shown in FIG. 2. The terminal end of the shaft of auger 86 has a bevel gear 108 affixed thereto for selective engagement by either the upper or lower bevel gears 110 and 112 which are affixed to shaft 114 and are spaced sufficiently that only one of the bevel gears 110,112 is engageable with driven bevel gear 108 at any time. Shaft 114 is driven by sprocket chain 116 which extends around sprockets respectively mounted on shaft 114 and the upper extremity of the shaft 118 of the elevating auger 36. Axial shifting of the shaft 114 is accomplished by means of a shift rod 120 as shown in FIG. 2, the lower end of which is operated by a pivoted shift lever 122 mounted, for example, on the top of the housing of the hammermill 22 as shown in FIG. 2.

The end of the tubular housing 88 of upper distributing auger 86 which is nearest the gear shift unit 104 communicates with the upper end of a substantially vertical conduit 124 which discharges at its lower end into the housing of hammermill 22. The purpose of the gear shift unit 104 is to effect reversible rotation of the distributing auger 86 and when the same is rotated in an opposite direction from that in which auger 86 distributes material to bins 52 and 54, said auger will feed mixed material as it discharges from the upper end of elevating auger 36 for gravity feed down conduit 124 to the hammermill in which the mixed material is ground to a finer degree and the operation of the hammermill also effects further mixing of the material until the same is ready for discharge from the lower part of the housing of hammermill 22 in which a horizontal converging auger 126 is rotatably mounted to feed ground material from opposite sides of the hammermill to the center thereof where it is discharged into the lower end of an inclined discharge housing 128 within which a discharge auger 130 is mounted and is driven by bevel gears respectively fixed to the lower end of the shaft of auger 130 and on additional jack shaft 132, see FIG. 2. Said jack shaft is driven by sprocket chain 134 which extends around sprocket gears respectively fixed to the shaft of mixing auger 34 and jack shaft 132 as shown in FIG. 2.

Figure 4:
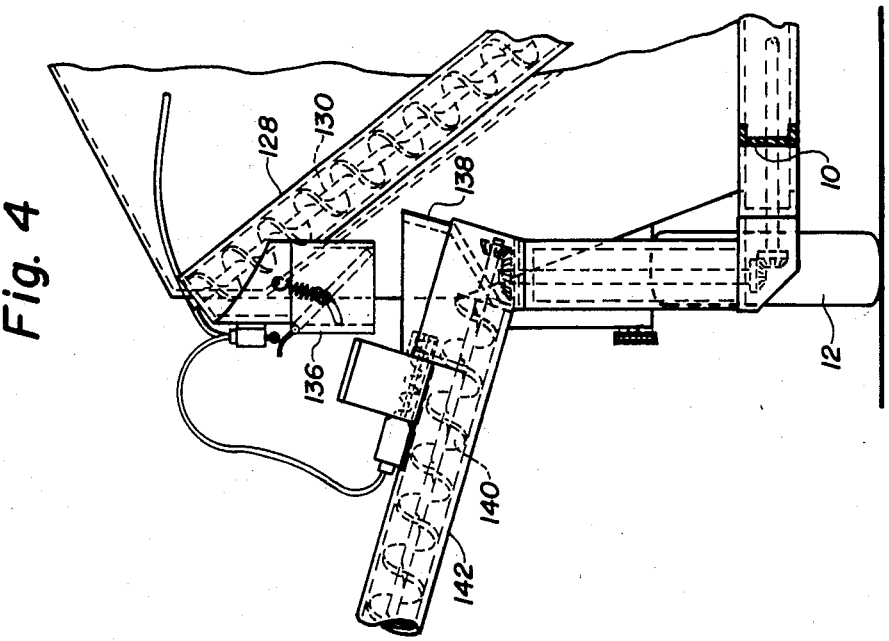
FIG. 4 is a fragmentary vertical sectional view of a portion of the machine as seen on the line 4—4 of FIG. 1.

The upper end of the inclined discharge housing 128 exits into a depending chute 136, see FIG. 4, which is directly above an inlet hopper 138 from which one end of a laterally extending discharge auger 140 projects within a complementary tube 142.

With the exception of the metering augers which have been described and referred to hereinabove, all of the other augers thus far described are driven by the PTO shaft 18, operation of which is controlled by the power unit from which the shaft 18 is mounted, such as a tractor. The metering augers however are driven by individual D.C. electric motors as controlled by switches and adjustable control means such as rheostats mounted within control box 144 shown in the lower portion of FIG. 1. Also as shown in FIG. 1, shaft 28 of the hammermill 22 drives an electric A.C. generator 146 shown in the lower part of FIG. 1 through the means of a sprocket chain 148. The electric control box 144 also contains converters to provide D.C. voltage from the A.C. generator 146 and, by suitable circuit lines, not shown, the D.C. current as controlled by the control elements in the box 144, is conducted respectively to the D.C. motor 150 which drives metering auger 62 in forward bin 52 by means of a sprocket chain 152; D.C. motor 154 for metering auger 64 in the bottom of bin 54 which is driven by sprocket chain 156; D.C. motor 158, see FIG. 3, for metering auger 72 in the bottom of bin 66, driven by sprocket chain 160, see FIG. 1, lower right corner; and D.C. motor 162 for metering auger 74 in the bottom of bin 68, driven by sprocket chain 164. Varying the speeds of the D.C. motors described above is easily facilitated by the control means mounted in the electric control box 144, such as rheostats or other similar means. Further, the control means are operated to render the metering augers idle such as when the bins are having material delivered thereto by mixing auger 34, elevating auger 36 and upper distributing auger 86, under which conditions the auger 34 serves primarily as a delivery auger rather than a mixing auger due to each of the bins requiring different materials in unmixed condition. However, when auger 34 is to serve in a mixing capacity, the speed of the various metering augers is regulated by adjusting the control means in the box 144, as required according to a desired formulation, whereby various components for the mixture are delivered to space 80 wherein the discharges from all of the metering augers converge for delivery of the respective components to the mixing auger 34 and from there it ascends in at least partially mixed condition by the elevating auger 36 to the portion of the upper distributing auger 86 which extend to the inlet end of conduit 124, which directs the mixed material to the unit 22 specifically illustrated as a hammermill or the like, wherein not only grinding of the material occurs but further mixing thereof is also produced.

From the foregoing, it will be seen that relatively simple, straightforward mechanisms have been combined in a manner capable of producing a relatively wide range of mixtures of different agricultural feed material which, when the mixture is discharged from the machine, is in condition to be delivered either to storage, feed means such as feed bins or troughs, or otherwise. By a simple adjustment of electrical control means, and/or the speed of the power unit connected to the PTO, a precise composition of a mixed agricultural feed product is made possible.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. An agricultural mixing and grinding machine comprising in combination, a frame having forward and rearward ends and supporting a plurality of bins for different agricultural materials, material receiving means on said frame comprising a hopper adjacent the rearward end of said frame, delivery means on said frame operable to move material from said receiving means and distribute the same selectively to said bins, said delivery means including a confluence mixing auger located below said bins and extending longitudinally of said frame, metering augers respectively positioned to receive individual materials from said bins and discharge measured quantities thereof to said confluence mixing auger, adjustable drive means for each of said metering augers operable to selectively and respectively drive the same at variable independent speeds in desired ratios to each other to provide desired proportions of materials in the final mixed product grinding means on said frame adjacent said forward end of said frame positioned to receive said mixed material from said confluence mixing auger, discharge means on said frame arranged to receiving mixed and ground material from said grinding means and to discharge it from said machine, said delivery means also including an upper distributing auger extending along the upper portions of said bins and arranged to distribute material thereto from an elevating auger communicating with the delivery end of said confluence mixing auger, said upper distributing auger also having a portion extending toward said grinding means, and reversible drive means for said upper distributing auger operable selectively to drive said upper distributing auger in one direction to deliver unmixed material to said bins from said hopper when said metering augers are idle and to drive said upper distributing auger in another direction to deliver mixed material to said grinding means when said metering augers are operating.

2. The machine according to claim 1 further including a PTO shaft adapted to be connected to a tractor or the like, an A.C. generator on said frame adapted to be driven by said PTO shaft, electrical converter means connected to said A.C. generator and operable to convert the output thereof to D.C. voltage, said drive means comprising D.C. electric motors respectively connected to said metering augers and connected in circuit with said D.C. voltage, and speed regulating means connected to said D.C. electric motors and operable to regulate the speed of said metering augers to produce a selected mixture of materials to be discharged to said confluence mixing auger.

3. The machine according to claim 1 in which said plurality of bins comprise a first bin and a second bin of similar cross-sectional shape, said first and second bins having V-shaped bottoms sloping downward and said metering augers being located in the lower portions of said bottoms, and third and fourth bins supported underneath said bottom of one of said first and second bins.

4. The machine according to claim 3 in which said confluence mixing auger extends longitudinally of said frame beneath the bottom of said first and second bins and beneath said third and fourth bins, and all of said metering augers having discharge ends communicating with a common receiving means in said confluence mixing auger.

5. The machine according to claim 4 in which the discharge ends of all of said metering augers converge at a common location above said mixing auger.

6. The machine according to claim 1 further including a PTO shaft on said frame, rotatable shafts interconnected between said PTO shaft and all of said augers except said metering augers, and sprocket and chain means interconnecting said rotatable shafts to said PTO shaft.

7. The machine according to claim 6 in which said grinding means has a converging auger therein driven by said PTO shaft and operable to discharge ground and mixed material from said grinding means to a discharge auger extending laterally from said grinding means.

8. The machine according to claim 1 in which certain of said bins are arranged fore and aft relative to each other and said upper distributing auger has an outlet opening over the fore bin provided with a closure, whereby when said closure is in closed position material will be delivered to the aft bin but will be delivered to the fore bin when the outlet opening is open.

9. The machine according to claim 8 wherein manually operable shifting means are connected to said closure for actuation thereof.

10. The machine according to claim 1 wherein said metering augers deliver said different materials from said bins to a substantially common location above said confluence mixing auger.

* * * * *